US012054667B2

(12) United States Patent
Hirano et al.

(10) Patent No.: US 12,054,667 B2
(45) Date of Patent: Aug. 6, 2024

(54) DIVERTING AGENT AND METHOD OF FILLING FRACTURE IN WELL USING SAME

(71) Applicant: MITSUBISHI CHEMICAL CORPORATION, Tokyo (JP)

(72) Inventors: Yasuhiro Hirano, Tokyo (JP); Takahiro Saka, Tokyo (JP); Ryosuke Taniguchi, Tokyo (JP); Chizuko Furo, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 17/354,385

(22) Filed: Jun. 22, 2021

(65) Prior Publication Data

US 2021/0309911 A1 Oct. 7, 2021

Related U.S. Application Data

(63) Continuation of application No. PCT/JP2019/051044, filed on Dec. 25, 2019.

(30) Foreign Application Priority Data

Dec. 27, 2018 (JP) ................................. 2018-245097

(51) Int. Cl.
*C08F 216/06* (2006.01)
*C08F 220/02* (2006.01)
*C09K 8/508* (2006.01)

(52) U.S. Cl.
CPC .......... *C09K 8/5083* (2013.01); *C08F 216/06* (2013.01); *C08F 220/02* (2013.01)

(58) Field of Classification Search
CPC ..... C09K 8/5083; C09K 8/508; C08F 216/06; C08F 220/02; C08F 116/06; C08F 218/08; C08F 8/00; E21B 43/26
See application file for complete search history.

(56) References Cited

U.S. PATENT DOCUMENTS

| | | | |
|---|---|---|---|
| 2016/0137906 A1* | 5/2016 | Guan ..................... | C09K 8/588 166/305.1 |
| 2016/0298017 A1 | 10/2016 | Takahashi et al. | |
| 2017/0150713 A1* | 6/2017 | Saka .......................... | C08F 8/10 |
| 2017/0210965 A1* | 7/2017 | Cortez ..................... | C09K 8/72 |
| 2017/0253703 A1 | 9/2017 | Yoshikawa et al. | |
| 2018/0010037 A1 | 1/2018 | Yoshikawa et al. | |
| 2020/0172796 A1 | 6/2020 | Tsuji et al. | |
| 2020/0317985 A1 | 10/2020 | Fujita et al. | |
| 2020/0325383 A1* | 10/2020 | Saka ....................... | C09K 8/512 |
| 2023/0147740 A1 | 5/2023 | Tsuji et al. | |

FOREIGN PATENT DOCUMENTS

| | | | |
|---|---|---|---|
| CN | 107286916 A | * | 10/2017 |
| CN | 107286916 A | | 10/2017 |
| CN | 107629774 A | * | 1/2018 |
| CN | 107629774 A | | 1/2018 |
| CN | 109294542 A | | 2/2019 |
| CN | 110997861 A | | 4/2020 |
| CN | 111527181 A | | 8/2020 |
| CN | 111527182 A | | 8/2020 |
| EP | 3666849 A1 | | 6/2020 |
| EP | 3733810 A1 | | 11/2020 |
| EP | 3733811 A1 | | 11/2020 |
| JP | 2016-056272 A | | 4/2016 |
| JP | 2016-147971 A | | 8/2016 |
| JP | 2016-147972 A | | 8/2016 |
| WO | WO 2000009589 | * | 2/2000 |
| WO | 2015/072317 A1 | | 5/2015 |

OTHER PUBLICATIONS

ISR issued in WIPO Patent Application No. PCT/JP2019/051044, Apr. 7, 2020, English translation.
Written Opinion (PCT/ISA/237) issued in WIPO Patent Application No. PCT/JP2019/051044, Apr. 7, 2020.
IPRP issued in WIPO Patent Application No. PCT/JP2019/051044, Jun. 16, 2021, English translation.
Extended European Search Report issued in EP Patent Application No. 19906487.4, dated Jan. 20, 2022.
Office Action issued in Chinese Patent Application No. 201980086154.8, May 27, 2023, translation.
Office Action issued in JP Patent Application No. 2020-563397, Oct. 17, 2023, translation.
Office Action issued in Chinese Patent Application No. 201980086154.8, Dec. 21, 2023, translation.
Office Action issued in Chinese Patent Application No. 201980086154.8, May 14, 2024, translation.
Office Action issued in EP Patent Application No. 19906487.4, May 6, 2024.
Liu, et al., "Chemical Technologies for Profile Control and Water Plugging", Petroleum Industry Press 2002, p. 188, translation.

\* cited by examiner

*Primary Examiner* — Kumar R Bhushan
(74) *Attorney, Agent, or Firm* — GREENBLUM & BERNSTEIN, P.L.C.

(57) ABSTRACT

A diverting agent is provided that exhibits sufficient filling properties against a fracture in a well because of swelling without complete dissolution for a certain period of time (about 30 minutes to 5 hours), and that quickly dissolves and can be removed even at a low temperature of 40° C. to 60° C. after a certain period of time has passed. Also provided is a diverting agent that contains a modified polyvinyl alcohol-based resin.

4 Claims, No Drawings

DIVERTING AGENT AND METHOD OF FILLING FRACTURE IN WELL USING SAME

CLAIM FOR PRIORITY

This application is a Continuation of PCT/JP2019/051044 filed Dec. 25, 2019, and claims the priority benefit of Japanese application 2018-245097 filed Dec. 27, 2018, the contents of which are expressly incorporated by reference herein in their entireties.

TECHNICAL FIELD

The present invention relates to a diverting agent and a mining method using the diverting agent. More specifically, the present invention relates to a diverting agent to be used during construction of an excavation method using a hydraulic fracturing method.

BACKGROUND ART

For collecting petroleum or either underground resources, a hydraulic fracturing method in which high-pressure water is injected into an underground shale layer to cause fractures is widely adopted. In the hydraulic fracturing method, at first, a vertical hole (vertical well) with a depth of several thousand of meters is excavated vertically by a drill, and then, when the vertical hole reaches the shale layer, a horizontal hole (horizontal well) with a diameter of ten to several tens of centimeters is excavated horizontally. By filling the vertical well and the horizontal well with a fluid and pressurizing the fluid, fractures are generated from the well. Natural gas, petroleum (shale gas/oil), or the like in the shale layer flows out from the fractures, and is then collected. According to such a method, a resource inflow cross-section of the well can be increased by generation of fractures and underground resources can be efficiently collected.

In the hydraulic fracturing method described above, prior to generation of fractures by fluid pressurization, preliminary blasting called perforation is performed in the horizontal well. By such preliminary blasting, borings are made from the well to a production layer. After that, by injecting a fracturing fluid into the well, the fluid flows into these borings, and a load is applied to the borings. Then, fractures are generated in these borings and grow into fractures in a size suitable for resource collection.

In the hydraulic fracturing method, a part of fractures that have already been generated are temporarily filled with an additive called a diverting agent in order to grow fractures that have already been generated larger or to generate more fractures. By temporarily filling a part of the fractures with the diverting agent and pressurizing the fracturing fluid filled in the well in this state, the fluid may enter other fractures, so that other fractures can grow larger or new fractures can be generated.

Since the diverting agent is used to temporarily fill the fractures as described above, a diverting agent which can maintain the shape for a certain period of time and disappears by hydrolysis when natural gas, petroleum, or the like is collected is used. For example, various techniques in which a hydrolyzable resin such as polyglycolic acid or polylactic acid is used as a diverting agent have been proposed.

PTL 1 has proposed a temporary sealing agent for use in well boring, which contains polyglycolic acid having high biodegradability among biodegradable aliphatic polyester-based resins.

In addition, PTL 2 has proposed a powder containing particles of polylactic acid which is a biodegradable resin, and in the powder, 50 mass % or more of particles do not pass through a sieve having an opening of 500 µm and the particles have an angle of repose of 51 degrees or more.

Further, PTL 3 has proposed hydrolyzable particles having a dispersion structure in which fine particles of a polyoxalate having a high biodegradability for adjusting the hydrolysis performance of polylactic acid are distributed in the polylactic acid, and having an average particle diameter ($D_{50}$) in a range of 300 µm to 1,000 µm and a roundness, that is, a minor axis/major axis ratio, of 0.8 or more.

Furthermore, PTL 4 has proposed polyoxalate particles having an average particle diameter ($D_{50}$) in a range of 300 µm to 1,000 µm and a roundness, that is, a minor axis/major axis ratio, of 0.8 or more.

CITATION LIST

Patent Literature

PTL 1: WO 2015/072317
PTL 2: JP-A-201656272
PTL 3: JP-A-2016-147971
PTL 4: JP-A-2016-147972

SUMMARY OF INVENTION

Technical Problem

In the hydraulic fracturing method, it is necessary to fill, with the diverting agent, the fractures that have already been generated without gaps in order to grow the fractures or generate new fractures. In addition, there are places where the temperature can be as low as 40° C. to 60° C. depending on where the resources are collected. However, polyglycolic acid, polylactic acid, and the like have a problem that the biodegradation rate is low in the low temperature range as described above, and it takes a considerable time before they are removed.

Here, an object of the present invention is to provide a diverting agent that exhibits sufficient filling properties against a fracture in a well because of swelling without completely dissolution for a certain period of time (about 30 minutes to 5 hours), and that quickly dissolves and be removed even at a low temperature of 40° C. to 60° C. after a certain period of time has passed.

Solution to Problem

As a result of intensive studies, the present inventors have found that when the diverting agent contains a modified polyvinyl alcohol-based resin, the above problems can be solved.

That is, the present invention relates to the following <1> to <4>.

<1> A diverting agent, containing: a modified polyvinyl alcohol-based resin.
<2> The diverting agent according to <1>, wherein the modified polyvinyl alcohol-based resin is a polyvinyl alcohol-based resin having a hydrophilic group.

<3> The diverting agent according to <1> or <2>, wherein the modified polyvinyl alcohol-based resin has a modification rate of 10.0 mol % or less.

<4> A method of temporarily filling a fracture generated in a well, the method including: allowing the diverting agent according to fracture to be filled with a flow of a fluid in the well.

Advantageous Effects of Invention

Because of swelling without completely dissolution for a certain period of time (about 30 minutes to 5 hours), the diverting agent of the present invention can exhibit sufficient filling properties even when used in an amount smaller than conventional diverting agents. In addition, the diverting agent of the present invention can quickly dissolves and be removed even at a low temperature of 40° C. to 60° C. after a certain period of time has passed. Therefore, the hydraulic fracturing method performed in excavation work of natural gas, petroleum, or the like can be efficiently performed using the diverting agent of the present invention.

DESCRIPTION OF EMBODIMENTS

Hereinafter, the present invention will be described in detail, but these show examples of desirable embodiments, and the present invention is not specified in these contents.

The term "polyvinyl alcohol" is sometimes simply referred to as "PVA".

In the present invention, (meth)allyl means allyl or methallyl, (meth)acryl means acryl or methacryl, and (meth)acrylate means acrylate or methacrylate.

[Modified PVA-Based Resin]

The diverting agent of the present invention contains a modified PVA-based resin.

The modified PVA-based resin is more likely to swell than an unmodified PVA-based resin because of enclosing a solvent such as water inside the PVA chain entwined by the structure formed by the modifying group. In addition, the modified PVA-based resin loses three-dimensional symmetry due to the structure formed by the modifying group, so that the crystallinity is lowered and the water solubility is increased.

Therefore, the diverting agent of the present invention containing a modified PVA-based resin can exhibit sufficient filling properties against a fracture in a well and can exhibit excellent dissolution performance during subsequent removal.

In the modified PVA-based resin for use in the present invention, the content (modification rate) of a structural unit having the modifying group is preferably 10.0 mol % or less, more preferably 7.0 mol % or less, and still more preferably 5.0 mol % or less of the entire structural unit.

The modification rate is preferably 0.1 mol % or more, more preferably 0.5 mol % or more, and still more preferably 1.0 mol % or more. When the modification rate is too small, the solubility may decrease.

When the modification rate is too large or too small, the filling properties tend to decrease.

The modification rate can be determined from a $^1$H-NMR spectrum (solvent: DMSO-$d_6$ or $D_2O$) of a PVA-based resin having a degree of saponification of 100 mol %.

The modified PVA-based resin is obtained by introducing any functional group into the unmodified PVA. Examples of the functional group to be introduced include various functional groups including: anionic groups such as a carboxyl group, a sulfonic acid group and a phosphoric acid groups; cationic groups such as a quaternary ammonium group; active methylene group-containing modifying groups such as an acetoacetyl group, a diacetone group, and a diacetone acrylamide group; a carbonyl group; an amino group; a silanol group; an oxyalkylene group; and a mercapto group.

Further, a PVA-based resin having a 1,2-diol structural unit in a side chain can also be used as the modified PVA-based resin.

Among these, from the viewpoints of the swelling property and solubility, a modified PVA-based resin having a carboxyl group, a cationic group or an active methylene group-containing modifying group is preferred. In addition, from the viewpoints of the swelling property and solubility, a modified PVA-based resin having a carboxyl group or a cationic group, which is a hydrophilic group, is more preferred.

[PVA-Based Resin Having Carboxyl Group]

The polyvinyl alcohol-based resin having a carboxyl group (hereinafter, may be referred to as a carboxyl group-containing PVA-based resin) can be obtained by copolymerizing a monomer having a carboxyl group and a vinyl ester-based monomer and then saponifying the copolymer.

The monomer having a carboxyl group is not particularly limited and has a carboxyl group directly next to the vinyl group, and may be used alone or in combination of two or more thereof.

Specific examples include: carboxyl group-containing unsaturated monomers such as acrylic acid, methacrylic acid, crotonic acid, maleic acid, maleic anhydride, fumaric acid, and itaconic acid, and those in which the carboxyl group is totally or partially neutralized by a base such as an alkaline compound (for example, sodium hydroxide, or potassium hydroxide); monoalkyl ester of the above carboxyl group-containing unsaturated monomers, such as methyl acrylate, ethyl acrylate, methyl methacrylate, monomethyl fumarate, and monomethyl maleate; or dialkyl esters of the above carboxyl group-containing unsaturated monomers, such as diethyl fumarate and diethyl maleate. The number of carbon atoms of these esters is generally preferably 1 to 20, more preferably 1 to 10, and particularly preferably 1 to 4 from the viewpoint of economy and practicality.

Examples thereof include alcohols having a carboxyl group and compounds having a carboxyl group and having a functional group such as aldehyde or thiol.

Among these, in terms of reactivity with a vinyl ester-based monomer, preferred are ethylenically unsaturated carboxylic acid monoesters, more preferred are maleic acid monoalkyl esters and itaconic acid monoalkyl esters, and particularly preferred are maleic acid monoalkyl esters.

The carboxyl group-containing PVA-based resin preferably has a degree of saponification of 70 mol % to 100 mol %, more preferably 75 mol % to 99.9 mol %, and still more preferably 80 mol % to 99.8 mol %. When the degree of saponification is too low, the water absorption property tends to decrease.

The degree of saponification can be measured in accordance with JIS K 6726:1994.

The carboxyl group-containing PVA-based resin preferably has an average polymerization degree of 300 to 5,000, more preferably 500 to 4,000, and still more preferably 1,000 to 3,000. When the average polymerization degree is too low, the water resistance tends to decrease, and when the average polymerization degree is too high, the viscosity increases, and handling and production tend to be difficult.

The average polymerization degree can be measured in accordance with JIS K 6726:1994.

The viscosity of a 4 mass % aqueous solution of the carboxyl group-containing PVA-based resin is preferably 2 mPa·s to 80 mPa·s, more preferably 4 mPa·s to 70 mPa·s, and still more preferably 10 mPa·s to 60 mPa·s. When the viscosity is too low, the water resistance tends to decrease, and when the viscosity is too high, the viscosity increases, and handling and production tend to be difficult.

The viscosity of the 4 mass % aqueous solution of the carboxyl group-containing PVA-based resin is a viscosity at 20° C. measured in accordance with JIS K 6726:1994, by preparing a 4 mass % aqueous solution of the carboxyl group-containing PVA-based resin.

Examples of a method for producing the carboxyl group-containing PVA-based resin include (1-1) a method of obtaining a copolymer from a carboxyl group-containing unsaturated monomer and a vinyl ester-based compound and then saponifying the copolymer, and (1-2) a method of polymerizing a vinyl ester-based compound in the presence of an alcohol containing carboxyl group or a compound containing a carboxyl group and a functional group such as aldehyde or thiol as a chain transfer agent and then saponifying the polymer with a catalyst such as an alkali metal hydroxide. Among these, the method of (1-1) is practical in terms of resin production and performance.

In the present invention, among the carboxyl group-containing PVA-based resin, a maleic acid-modified PVA-based resin and an itaconic acid-modified PVA-based resin are preferred in terms of being easily polymerizable with a vinyl ester-based monomer, and a maleic acid-modified PA-based resin is more preferred in terms of handleability.

Hereinafter, the method of (1-1) will be specifically described.

Examples of the above carboxyl group-containing unsaturated monomer include ethylene unsaturated dicarboxylic acids (such as maleic acid, fumaric acid, or itaconic acid), ethylene unsaturated carboxylic acid monoesters (such as maleic acid monoalkyl ester, fumaric acid monoalkyl ester, and itaconic acid monoalkyl ester), ethylene unsaturated dicarboxylic acid diesters (such as maleic acid dialkyl ester, fumaric acid dialkyl ester, or itaconic acid dialkyl ester), ethylene unsaturated carboxylic acid anhydrides (such as maleic anhydride or itaconic anhydride), or monomer of (met)acrylic acid or the like, and salts thereof.

Among these, in terms of reactivity with a vinyl ester-based monomer, preferred are ethylenically unsaturated carboxylic acid monoesters, more preferred are maleic acid monoalkyl esters and itaconic acid monoalkyl esters, and particularly preferred are maleic acid monoalkyl esters.

As the vinyl ester-based compound, vinyl formate, vinyl acetate, vinyl propionate, vinyl butyrate, vinyl caprate, vinyl laurate, vinyl versatate, vinyl palmitate, vinyl stearate and the like can be used alone or in combination. Vinyl acetate is particularly preferred in terms of practicality.

In the present invention, when polymerizing the carboxyl group-containing unsaturated monomer and the vinyl ester-based compound, a saponified product of a copolymer of a vinyl ester-based monomer and a copolymerizable monomer can also be used, in addition to the above carboxyl group-containing monomer and the vinyl ester-based compound.

Examples of the copolymerizable monomer include: olefins such as ethylene, propylene, isobutylene, α-octene, α-dodecene, and α-octadecene; hydroxy group-containing α-olefins such as 3-buten-1-ol, 4-penten-1-ol, 5-hexen-1-ol, and 3,4-dihydroxy-1-butene, and derivatives such as an acylated product thereof; unsaturated acids such as an acrylic acid, a methacrylic acid, a crotonic acid, a maleic acid, a maleic anhydride, an itaconic acid, an undecylenic acid, and a salt, a monoester or a dialkyl ester thereof; nitriles such as acrylonitrile and methacrylonitrile; amides such as diacetone acrylamide, acrylamide and methacrylamide; olefin sulfonic acids such as an ethylene sulfonic acid, an allyl sulfonic acid, a methallyl sulfonic acid or a salt thereof; alkyl vinyl ethers; vinyl compounds such as dimethylallyl vinyl ketone, N-vinylpyrrolidone, vinyl chloride, vinylethylene carbonate, 2,2-dialkyl-4-vinyl-1,3-dioxolane, and glycerin monoallyl ether; substituted vinyl acetates such as isopropenyl acetate and 1-methoxyvinyl acetate; vinylidene chloride; 1,4-diacetoxy-2-butene; 1,4-dihydroxy-2-butene; and vinylene carbonate.

Further examples include: polyoxyalkylene group-containing monomers such as polyoxyethylene (meth)allyl ether, polyoxyethylene (meth)acrylamide, polyoxypropylene (meth)acrylamide, polyoxyethylene (meth)acrylate, polyoxypropylene (meth)acrylate, polyoxyethylene (1-(meth)acrylamide-1,1-dimethylpropyl) ester, polyoxyethylene vinyl ether, polyoxypropylene vinyl ether, polyoxyethylene allylamine, polyoxypropylene allylamine, polyoxyethylene vinylamine, and polyoxypropylene vinylamine; and cationic group-containing monomers such as N-acrylamide methyltrimethylammonium chloride, N-acrylamide ethyltrimethylammonium chloride, N-acrylamide propyltrimethylammonium chloride, 2-acryloxyethyltrimethylammonium chloride, 2-methacryloxyethyltrimethylammonium chloride, 2-hydroxy-3-methacryloyloxypropyltrimethylammonium chloride, allyltrimethylammonium chloride, methallyltrimethylammonium chloride, 3-butenetrimethylammonium chloride, dimethyldiallylammonium chloride, and diethyidiallylammonium chloride.

An amount of the copolymerizable monomer to be introduced varies depending on the type of the monomer, and cannot be specified unconditionally. However, it is generally 10 mol % or less, and particularly preferably 5 mol % or less of the entire structural unit. When the amount of the copolymerizable monomer to be introduced is too large, the water solubility tends to be impaired, or the compatibility with a crosslinker tends to decrease.

In addition, those where the amount produced of a heterogeneous bond is increased relative to the 1,3-bond that is mainly produced, by setting the polymerization temperature to a high temperature at the time of polymerization or copolymerization of the vinyl ester-based monomer and another monomer and the proportion of 1,2-diol bond in the PVA main chain is adjusted to be approximately 1.6 mol % to 3.5 mol %, can be used.

[PVA-Based Resin Having Cationic Group]

The PVA-based resin having a cationic group (hereinafter, may be referred to as a cationic group-containing PVA-based resin) can be obtained by saponifying the copolymer of an unsaturated monomer having a cationic group and a vinyl ester-based monomer. The cationic group-containing PVA-based resin has a vinyl alcohol unit having a corresponding degree of saponification, a structural unit derived from a vinyl ester-based monomer of an unsaponified moiety and a cationic structural unit.

The cationic group-containing PVA-based resin preferably has a degree of saponification of 70 mol % to 100 mol %, more preferably 75 mol % to 99.9 mol %, and still more preferably 78 mol % to 99.8 mol %. When the degree of saponification is too low, the water absorption property tends to decrease.

The above degree of saponification is measured in accordance with JIS K 6726:1994.

The cationic group-containing PVA-based resin preferably has an average polymerization degree of 300 to 5,000, more preferably 500 to 4,000, and still more preferably 1,000 to 3,000. When the average polymerization degree is too low, the water resistance tends to decrease, and when the average polymerization degree is too high, the viscosity increases, and handling and production tend to be difficult.

The above average polymerization degree is measured in accordance with JIS K 6726:1994.

The viscosity of a 4 mass % aqueous solution of the cationic group-containing PVA-based resin is preferably 2 mPa·s to 80 mPa's, more preferably 4 mPa·s to 70 mPa·s, and still more preferably 10 mPa·s to 60 mPa·s. When the viscosity is too low, the water resistance tends to decrease, and when the viscosity is too high, the viscosity increases, and handling and production tend to be difficult.

The viscosity of the 4 mass % aqueous solution of the cationic group-containing PVA-based resin is a viscosity at 20° C. measured in accordance with JIS K 6726:1994, by preparing a 4 mass % aqueous solution of the cationic group-containing PVA-based resin Examples of the unsaturated monomer having a cationic group include quaternary ammonium salts such as trimethyl-(methacrylamide)-ammonium chloride, hydroxyethyltrimethylammonium chloride, diallyldimethylammonium chloride, trimethyl-(3-methacrylamidopropyl) ammonium chloride, trimethyl-(3-acrylamide-3-dimethylpropyl)-ammonium chloride, 3-acrylamidopropyltrimethylammonium chloride, 3-methacrylamide propyltrimethylammonium chloride, N-(3-allyloxy-2-hydroxypropyl) dimethylamine, N-(4-allyloxy-3-hydroxybutyl) diethylamine, acrylamide, N-methylacrylamide, N-ethylacrylamide, N,N-dimethylacrylamide, diacetoneacrylamide, N-methylol acrylamide, methacrylamide, N-methylmethacrylamide, N-ethylmethacrylamide, and N-methylol methacrylamide.

Among these, diallyldimethylammonium chloride and trimethyl-(3-methacrylamidepropyl)-ammonium chloride are preferred in that the effect of the present invention is remarkably exhibited.

Examples of the vinyl ester-based monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, and vinyl versatate.

Among these, vinyl acetate is preferably used in terms of economy.

In order to obtain the above copolymers, any of the conventionally known polymerization methods, for example, bulk polymerization, solution polymerization, suspension polymerization, dispersion polymerization, or emulsion polymerization can be adopted. Industrially, solution polymerization using methanol, toluene or the like is preferred.

Examples of the method for charging each component (monomer) during polymerization include a method by batch dropping, a method by divided dropping, and a method by continuous dropping, which may be appropriately selected. When a chain transfer agent is allowed to coexist for polymerization, it is preferable to adjust the amount of the chain transfer agent according to the reaction rate of vinyl acetate such that the modification rate of the cationic group-containing PVA-based resin becomes a predetermined value.

Further, in addition to the vinyl ester-based monomer, a copolymerizable unsaturated monomer may be copolymerized.

Examples of such an unsaturated monomer include: monomers having a vinyl group and an epoxy group, such as glycidyl (meth)acrylate, glycidyl (meth)allyl ether, 3,4-epoxycyclohexyl (meth)acrylate, and allyl glycidyl ether; monomers having two or more allyl groups, such as triallyloxyethylene, diallyl maleate, triallyl cyanurate, triallyl isocyanurate, tetraallyloxyethane, diallyl phthalate, triallyl cyanurate, and triallyl isocyanurate; allyl ester monomers such as allyl acetate, vinyl acetoacetic ester, acetoacetic acid allyl ester, and diacetoacetic acid allyl ester; acetoacetoxyalkyl (meth)acrylates such as acetoacetoxyethyl (meth)acrylate and acetoacetoxypropyl (meth)acrylate; acetacetoxyalkyl crotonates such as acetoacetoxyethyl crotonate and acetoacetoxypropyl crotonate; 2-cyanoacetoacetoxyethyl (meth)acrylate; divinylbenzene; alkylene glycol (meth)acrylates such as ethylene glycol di(meth)acrylate, 1,2-propylene glycol di(meth)acrylate, 1,3-propylene glycol di(meth)acrylate, 1,4-butanediol di(meth)acrylate, 1,6-hexanediol di(meth)acrylate, and neopentyl glycol di(meth)acrylate; trimethylolpropane tri(meth)acrylate; allyl (meth)acrylate; hydroxyalkyl (meth)acrylates (the alkyl group is an alkyl group having 1 to 10 carbon atoms, and preferably an alkyl group having 1 to 6 carbon atoms) such as 2-hydroxyethyl (meth)acrylate, hydroxypropyl (meth)acrylate, and 4-hydroxybutyl (meth)acrylate; nitrile-based monomers such as (meta)acrylonitrile; styrene-based monomers such as styrene and α-methylstyrene; olefin such as ethylene, propylene, 1-butene, and isobutene; halogenated olefins such as vinyl chloride, vinylidene chloride, vinyl fluoride, and vinylidene fluoride; olefin-based monomers such as ethylene sulfonic acid; diene-based monomers such as 1,3-butadiene, 2-methyl butadiene, 1,3- or 2,3-dimethyl-1,3-butadiene, and 2-chloro-1,3-butadiene; hydroxy group-containing α-olefins such as 3-butene-1-ol, 4-pentene-1-ol, 5-hexene-1,2-diol, and glycerin monoallyl ether, and derivatives such as acylated products thereof; hydroxymethylvinylidene diacetates such as 1,3-diacetoxy-2-methylenepropane, 1,3-dipropionyloxy-2-methylenepropane, and 1,3-dibutyronyloxy-2-methylenepropane; unsaturated acids such as itaconic acid, maleic acid, acrylic acid, and salts or mono or dialkyl esters thereof; nitriles such as acrylonitrile; amides such as methacrylamide and diacetone acrylamide; compounds such as olefin sulfonic acid such as ethylene sulfonic acid, allyl sulfonic acid, methallyl sulfonic acid, 2-acrylamide-2-methylpropane sulfonic acid (AMPS) or salts thereof; vinyl alkyl dialkoxysilanes such as vinyltriethoxysilane, vinyltrimethoxysilane, vinyltripropoxysilane, vinyltributoxysilane, vinylmethyldimethoxysilane, and vinylmethyldiethoxysilane; γ-(meth)acryloxypropyltrialkoxysilanes such as γ-(meth)acryloxypropyltrimethoxysilane and γ-(meth)acryloxypropyltriethoxysilane; γ-(meth)acryloxypropylalkyldialkoxysilanes such as γ-(meth)acryloxypropylmethyldimethoxysilane and γ-(meth)acryloxypropylmethyldiethoxysilane; vinyltris(β-methoxyethoxy)silane; and hydroxymethylvinylidene diacetate.

In addition, examples thereof include diol-containing compounds such as 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diacyloxy-1-pentene, 4,5-dihydroxy-3-methyl-1-pentene, 4,5-diacyloxy-3-methyl-1-pentene, 5,6-dihydroxy-1-hexene, 5,6-diacyloxy-1-hexene, glycerin monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, glycerin monoisopropenyl ether, vinyl ethylene carbonate, and 2,2- dimethyl-4-vinyl-1,3-dioxolane. These monomers may be used alone or in combination of two or more thereof.

Thus, a copolymer of the unsaturated monomer having a cationic group and a vinyl ester-based monomer can be obtained.

Further, as a method for obtaining a saponified product of such a copolymer, a generally known method, for example, a method for saponifying an unsaponified vinyl ester-based copolymer and the like can be mentioned. As the saponification method, either alkali saponification or acid saponification can be adopted. Industrially, methanolysis catalyzed by sodium hydroxide or sodium methoxide in a methanol solvent is the most advantageous.

Modification can also be further performed after saponification. For example, the obtained PVA-based resin can be acetoacetic acid esterified, acetalized, urethanized, etherified, grafted, phosphoric acid esterified, or oxyalkylenated.

Further, the cationic group-containing PVA-based resin may be acetalized by a post-reaction from the viewpoint of water resistance.

The degree of acetalization in this case is generally 30 mol % to 90 mol %, more preferably 50 mol % to 87 mol %, and still more preferably 60 mol % to 85 mol %. When the degree of acetalization is too small, the filling properties are not sufficient. On the contrary, when the degree of acetalization is too large, the production is extremely difficult in terms of reaction. The degree of acetalization can be calculated based on the measurement result of $^1$H-NMR.

The method of the acetalization reaction is not particularly limited, and known methods such as a precipitation method and a dissolution method can be used.

In the case of the precipitation method, a method in which a cationic group-containing PVA-based resin is used as an aqueous solution, an acetalization reaction is carried out at a low temperature in a solvent mainly composed of water, and after a polyvinyl acetal-based resin is precipitated, the temperature of the system is raised to cause an aging reaction (completion of acetalization reaction and rearrangement of acetalized moieties) is preferably used.

In the case of the dissolution method, a method in which an acetalization reaction is carried out at a high temperature using an alcohol-based solvent such as isopropyl alcohol or a mixed solvent in which water and the like are used in combination with the alcohol-based solvent, then water and the like are added to the system to precipitate a polyvinyl acetal-based resin is preferably used.

Among these, a method of acetalizing the cationic group-containing PVA-based resin with an aldehyde compound in a solvent in the presence of an acid catalyst is preferably used.

The aldehyde compound for use in the above acetalization reaction is not particularly limited. Examples thereof include: aliphatic aldehydes such as formaldehyde (including trimer and multimer paraform-aldehyde), acetaldehyde (including trimer paraacetaldehyde), propionaldehyde, butyraldehyde, isobutyraldehyde, pentylaldehyde, isopentyl aldehyde, hexylaldehyde, 2-ethylhexyl aldehyde, and cyclohexylaldehyde; aliphatic dialdehydes such as glyoxal, succindialdehyde, and glutaraldehyde; aromatic aldehydes such as benzaldehyde, o-tolualdehyde, p-tolualdehyde, m-tolualdehyde, p-hydroxybenzaldehyde, and salicylaldehyde; and heterocyclic aldehydes such as furfural.

Among these, formaldehyde, acetaldehyde and butyraldehyde are preferably used, and formaldehyde is particularly preferably used. These aldehyde compounds may be used alone, or two or more thereof may be mixed and used.

The acid catalyst for use in the acetalization reaction is not particularly limited, and examples thereof include organic acids such as acetic acid and paratoluenesulfonic acid, and inorganic acids such as hydrochloric acid, sulfuric acid, and nitric acid. Sulfuric acid is preferably used.

After terminating the acetalization reaction, as a reaction terminator, alkaline compounds such as sodium hydroxide, potassium hydroxide, ammonia, sodium acetate, sodium carbonate, sodium hydrogen carbonate, and potassium carbonate, alkylene oxides such as ethylene oxide, and glycidyl ethers such as ethylene glycol diglycidyl ether can also be added.

[PVA-Based Resin Having Active Methylene Group-Containing Modifying Group]

Next, a PVA-based resin having an active methylene group-containing modifying group (hereinafter referred to as an active methylene group-containing PVA-based resin) will be described.

The active methylene group indicates a methylene group having an increased acidity, such as a methylene group adjacent to a carbonyl group. That is, a crosslinking reaction occurs in a portion where the resonance is stabilized between the methylene group and the carbonyl group.

Examples of the active methylene group-containing PVA-based resin include a PVA-based resin having a modifying group in which a carbonyl group such as a ketone, a carboxylic acid or a carboxylic acid ester and a methylene group are adjacent to each other. Specific examples thereof include a PVA-based resin having an acetoacetyl group or a diacetone group.

Among these, an acetoacetyl group-containing PVA-based resin (hereinafter, referred to as AA-modified PVA-based resin) or a PVA-based resin having a diacetone acrylamide structural unit is preferred, and the AA-modified PVA-based resin is further preferred in terms of the crosslinking property.

The active methylene group-containing PVA-based resin preferably has a degree of saponification of 70 mol % to 100 mol %, more preferably 75 mol % to 99.9 mol %, and still more preferably 80 mol % to 99.8 mol %. When the degree of saponification is too low, the water absorption property tends to decrease.

The above degree of saponification is measured in accordance with JIS K 6726:1994.

The active methylene group-containing PVA-based resin preferably has an average polymerization degree of 300 to 4,000, more preferably 500 to 3,500, and still more preferably 1,000 to 3,000. When the average polymerization degree is too low, the water resistance tends to decrease, and when the average polymerization degree is too high, the viscosity increases, and handling and production tend to be difficult.

The above average polymerization degree is measured in accordance with JIS K 6726:1994.

The viscosity of a 4 mass % aqueous solution of the active methylene group-containing PVA-based resin is preferably 2 mPa·s to 80 mPa·s, more preferably 4 mPa·s to 70 mPa·s, and still more preferably 10 mPa s to 60 mPa·s. When the viscosity is too low, the water resistance tends to decrease, and when the viscosity is too high, the viscosity increases, and handling and production tend to be difficult.

The 4 mass % aqueous solution viscosity of the active methylene group-containing PVA-based resin is a viscosity at 20° C. measured in accordance with JIS K 6726:1994, by preparing a 4 mass % aqueous solution of the active methylene group-containing PVA-based resin.

(Acetoacetyl Group-Containing PVA-Based Resin)

Hereinafter, as a preferred embodiment of the active methylene group-containing PVA-based resin, an AA-modified PVA-based resin will be described.

The AA-modified PVA-based resin is a resin in which an acetoacetyl group (AA group) is bonded directly or through an oxygen atom or a linking group to the main chain of a PVA-based resin, and examples thereof include a PVA-based resin having a structural unit having an AA group, represented by the following general formula (1). The AA-modified PVA-based resin contains a vinyl alcohol structural unit, other than the structural unit having an AA group, and further contains, if desired, a vinyl ester structural unit of an unsaponified moiety.

[Chem. 1]

$$\text{---}(CH_2\text{---}CH)\text{---} \quad (1)$$
$$\quad\quad\quad | $$
$$\quad\quad\quad OCOCH_2COCH_3$$

A content (degree of AA modification) of a structural unit having an AA group is generally 0.1 mol % to 10 mol %, preferably 0.3 mol % to 8 mol %, more preferably 0.5 mol % to 6 mol %, of the entire structural unit. When the degree of AA modification is too small, the water resistance tends to decrease, and when the degree of AA modification is too large, the water absorption property tends to decrease.

The degree of AA modification can be determined from the difference between the total amount of ester groups and the amount of acetic acid ester group of the AA-modified PVA-based resin.

The preferred degree of saponification, average polymerization degree, and viscosity of the 4 mass % aqueous solution of the AA-modified PVA-based resin are as described above.

A method for producing the AA-modified PVA-based resin is not particularly limited, and examples thereof can include (2-1) a method of reacting a PVA-based resin and diketene, (2-2) a method of reacting a PVA-based resin and an acetoacetic acid ester to effect transesterification, and (2-3) a method of saponifying a copolymer of vinyl acetate and vinyl acetoacetate. In particular, the resin is preferably produced by (2-1) the method of reacting a PVA-based resin and diketene, because the production process is simple and a high-quality AA-modified PVA is obtained.

Hereinafter, the method of (2-1) will be described.

As the PVA-based resin as a raw material, a saponified product of a polymer of a vinyl ester-based monomer, or a derivative thereof is generally used. Examples of the vinyl ester-based monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, and vinyl versatate. In terms of economy, vinyl acetate is preferably used.

In addition, a saponified product of a copolymer of a vinyl ester-based monomer and a copolymerizable monomer with the vinyl ester-based monomer can be used.

Examples of the copolymerizable monomer include: olefins such as ethylene, propylene, isobutylene, α-octene, α-dodecene, and α-octadecene; hydroxy group-containing α-olefins such as 3-buten-1-ol, 4-penten-1-ol, 5-hexen-1-ol, and 3,4-dihydroxy-1-butene, and derivatives such as an acylated product thereof; unsaturated acids such as an acrylic acid, a methacrylic acid, a crotonic acid, a maleic acid, a maleic anhydride, an itaconic acid, an undecylenic acid, and a salt, a monoester or a dialkyl ester thereof; nitriles such as acrylonitrile and methacrylonitrile; amides such as diacetone acrylamide, acrylamide and methacrylamide; olefin sulfonic acids such as an ethylene sulfonic acid, an allyl sulfonic acid, a methallyl sulfonic acid or a salt thereof; alkyl vinyl ethers; vinyl compounds such as dimethylallyl vinyl ketone, N-vinylpyrrolidone, vinyl chloride, vinylethylene carbonate, 2,2-dialkyl-4-vinyl-1,3-dioxolane, and glycerin monoallyl ether; substituted vinyl acetates such as isopropenyl acetate and 1-methoxyvinyl acetate; vinylidene chloride; 1,4-diacetoxy-2-butene; 1,4-dihydroxy-2-butene; and vinylene carbonate.

Further examples include: polyoxyalkylene group-containing monomers such as polyoxyethylene (meth)allyl ether, polyoxyethylene (meth)acrylamide, polyoxypropylene (meth)acrylamide, polyoxyethylene (meth)acrylate, polyoxypropylene (meth)acrylate, polyoxyethylene (1-(meth)acrylamide-1,1-dimethylpropyl) ester, polyoxyethylene vinyl ether, polyoxypropylene vinyl, ether, polyoxyethylene allylamine, polyoxypropylene allylamine, polyoxyethylene vinylamine, and polyoxypropylene vinylamine; and cationic group-containing monomers such as N-acrylamide methyltrimethylammonium chloride, N-acrylamide ethyltrimethylammonium chloride, N-acrylamide propyltrimethylammonium chloride, 2-acryloxyethyltrimethylammonium chloride, 2-methacryloxyethyltrimethylammonium chloride, 2-hydroxy-3-methacryloyloxypropyltrimethylammonium chloride, allyltrimethylammonium chloride, methallyltrimethylammonium chloride, 3-butenetrimethylammonium chloride, dimethyldiallylammonium chloride, and diethyldiallylammonium chloride.

An amount of the copolymerizable monomer to be introduced varies depending on the type of the monomer, and cannot be specified unconditionally. However, it is generally 10 mol % or less, and particularly preferably 5 mol % or less of the entire structural unit. When the amount of the copolymerizable monomer to be introduced is too large, the water solubility tends to be impaired.

In addition, those where the amount produced of a heterogeneous bond is increased relative to the 1,3-bond that is mainly produced, by setting the polymerization temperature to a high temperature at the time of polymerization or copolymerization of the vinyl ester-based monomer and another monomer and the proportion of 1,2-diol bond in the PVA main chain is adjusted to be approximately 1.6 mol % to 3.5 mol %, can be used.

In order for a PVA-based resin obtained by saponifying a polymer or copolymer of the vinyl ester-based monomer above to react with a diketene so as to introduce an acetoacetyl group, for example, a method of directly reacting a PVA-based resin with a gaseous or liquid diketene is used. In addition, a method of previously adsorbing and storing an organic acid to/in the PVA-based resin and then spraying and reacting a gaseous or liquid diketene in an inert gas atmosphere, or spraying and reacting a mixture of an organic acid and a liquid diketene onto a PVA-based resin, is also used.

A reaction apparatus for conducting the reaction above includes an apparatus capable of heating and equipped with a stirrer. For example, a kneader, a Henschel mixer, a ribbon blender, or other various blenders and stirring/drying devices can be used.

The AA-modified PVA-based resin may be pulverized. As for the pulverization method, for example, roller milling, bead milling, ball milling, jet milling, hammer milling, pin milling, grinding pulverization, corrosion pulverization, freeze pulverization or other methods are used.

The form of the above modified PVA-based resin is, for example, cylindrical (pellet), spherical, or powdery, and is preferably columnar or powdery in terms of improving the sealing effect and production. When used, it is preferably a mixture thereof.

When the form of the modified PVA-based resin is cylindrical (pellet), the diameter is preferably 0.5 mm to 5.0 mm, more preferably 1.0 mm to 4.0 mm, and still more preferably 1.5 mm to 3.0 mm; and the thickness is preferably 0.5 mm to 5.0 mm, more preferably 1.0 mm to 4.0 mm, and still more preferably 1.5 mm to 3.0 mm.

When the form of the modified PVA-based resin is powdery, the average particle diameter is preferably 10 μm to 1,000 μm, and more preferably 100 μm to 500 μm. The average particle diameter is a particle diameter at which the PVA-based resin is sieved by a dry sieving test method and the integrated value is 50%.

When the diameter, the thickness and the average particle diameter are too large, the water solubility tends to decrease, and when the diameter, the thickness and the average particle diameter are too small, the sealing effect tends to decrease.

[Diverting Agent]

The diverting agent of the present invention contains the above modified PVA-based resin. The content of the modified PVA-based resin is preferably 50 mass % to 100 mass %, more preferably 80 mass % to 100 mass %, and still more preferably 90 mass % to 100 mass % with respect to the entire diverting agent. When the content is too small, the effects of the present invention tend to be difficult to obtain.

In addition to the above modified PVA-based resin, additives such as sand, iron, ceramic, and other biodegradable resins can be blended in the diverting agent of the present invention.

The amount of the additive to be blended is preferably 50 mass % or less, more preferably 20 mass % or less, and still more preferably 10 mass % or less with respect to the entire diverting agent.

The diverting agent of the present invention can be produced by uniformly mixing the modified PVA-based resin and other additives, if necessary.

When petroleum, natural gas, or the like is excavated in a hydraulic fracturing method, the diverting agent of the present invention enters fractures or fissures formed in the well, and then temporarily fills the fractures or fissures, so that new fractures or fissures can be formed. As a method for filling the fractures or fissures, the diverting agent of the present invention is allowed to flow into the fracture to be filled with a flow of fluid in the well.

Further, since the diverting agent of the present invention is water-soluble and biodegradable, the diverting agent is rapidly dissolved in water and removed after use, and is then biodegraded. Therefore, the environmental load is small, and the diverting agent is very useful.

EXAMPLES

The present invention will be specifically described by way of the following Examples, but the present invention is not limited thereto.

In Examples, "parts", "%" and "ppm." mean mass basis unless otherwise specified.

Example 1

<Preparation of Modified PVA-Based Resin (PVA-1)>

Into a reaction can equipped with a reflux condenser, a dropping funnel and a stirrer, 100 parts of vinyl acetate, 26 parts of methanol, and 0.1 part of monomethyl maleate were charged. After raising the temperature to 60° C. under a nitrogen stream while stirring the contents, 0.001 mol % (relative to the total amount of the vinyl acetate) of tert-butyl peroxyneodecanoate (the temperature providing a half life of 1 hour was 65° C.) was charged as a polymerization catalyst, and the polymerization was started. Immediately after the start of polymerization, 2.2 parts (2 mol % relative to the total amount of the vinyl acetate) of monomethyl maleate and 0.008 mol % (relative to the total amount of the vinyl acetate) of tert-butyl peroxyneodecanoate were continuously further added in pace with the polymerization rate, and when the polymerization rate of the vinyl acetate was 73%, 0.01 part of 4-methoxyphenol and 58 parts of methanol for dilution/cooling were added to complete the polymerization. The amount of the residual active catalyst at the time of the completion of polymerization was 2 ppm relative to the total amount of the reaction solution.

Subsequently, the unreacted vinyl acetate monomer was removed to the outside of the system by a method of blowing a methanol vapor to obtain a methanol solution of a copolymer.

Then, the above solution was diluted with methanol to adjust the solid content concentration to 40%. After a methanol solution of 4% sodium hydroxide (in terms of sodium) was mixed in such a ratio as giving 30.0 mmol relative to 1 mol of the vinyl acetate structural unit in the copolymer, a saponification reaction was performed at a temperature of 40° C. to 50° C. for 25 minutes. The resin solidified by the saponification reaction was cut to obtain a modified PVA-based resin (PVA-1).

<Evaluation of PVA-1>

(Degree of Saponification)

The degree of saponification of PVA-1 was determined by the amount of alkali consumed for hydrolysis of the residual vinyl acetate structural unit in the resin according to JIS K 6726:1994. The results are shown in Table 1.

(Average Polymerization Degree)

The average polymerization degree of PVA-1 was analyzed according to JIS K 6726:1994. The results are shown in Table 1.

(Modification Rate)

In PVA-1, the content (modification rate) of the modifying group was measured by $^1$H-NMR (300 MHz proton NMR, $D_2O$ or $d_6$-DMSO solution, 50° C.). The results are shown in Table 1.

(Height Swelling Rate)

1. PVA-1 in an amount of 0.5 g was weighed and placed in a 10 mL test tube having an inner diameter of 13.5 mm, and the height of PVA-1 in the test tube at this time was measured as an initial height.
2. 7 mL of water was put into the test tube, followed by stirring, and PVA-1 was dispersed in the water.
3. The test tube was immersed in a water bath whose temperature had been controlled to 80° C., and was left for 30 minutes after the water temperature in the test tube was 80° C.
4. The height of PVA-1 in the test tube after 30 minutes was measured as the height after swelling.

5. The swelling ratio (height swelling rate) of PVA-1 was calculated according to the following equation. The results are shown in Table 1.

Height swelling rate (%)=(height after swelling/initial height)×1,00

(Residual Rate)

A 140 mL glass container with a lid containing 100 g of water was put into a thermostatic chamber, and the water temperature was set to 40° C. The long sides of 120 mesh (aperture: 125 μm, 10 cm×7 cm) made of nylon were folded in half, and both ends were heat-sealed to obtain a bag-like mesh (5 cm×7 cm).

1 g of PVA-1 was put into the obtained bag-like mesh, the opening was heat-sealed to obtain a bag-like mesh containing PVA-1, and then the mass was measured. The bag-like mesh containing PVA-1 was immersed in the glass container. After standing for 7 days in the thermostatic chamber at 40° C., the bag-like mesh containing PVA-1 was taken out of the glass container and dried at 140° C. for 3 hours. The mass of the bag-like mesh containing PVA-1 was measured, the mass of PVA-1 after drying and remaining in the bag-like mesh was calculated based on the mass before immersion, and the residual rate of PVA-1 was calculated according to the following equation. The results are shown in Table 1.

In following equation, the solid fraction (mass %) of the PVA-based resin was calculated by drying the PVA-based resin at 105° C. for 3 hours and measuring the mass of the PVA-based resin before and after drying.

[Math. 1]
$$\text{RESIDUAL RATE(MASS \%)} = \frac{\frac{\text{MASS (g) OF PVA-BASED RESIN AFTER DRYING}}{\text{SOLID FRACTION(MASS \%) OF PVA-BASED RESIN}} \times 100}{1(g) \times \frac{\text{OF PVA-BASED RESIN}}{100}}$$

(Average Particle Diameter)

PVA-1 was sieved by a dry sieving test method, and the particle diameter at which the integrated value was 50% was calculated and used as the average particle diameter of PVA-1. The results are shown in Table 1.

Example 2

<Preparation of Modified PVA-Based Resin (PVA-2)>

Into a kneader, 100 parts of a PVA (degree of saponification: 98.0 mol %, viscosity of 4% aqueous solution: 54 mPa·s, average polymerization degree: 2400) was charged, 30 parts of acetic acid was charged thereto, the mixture was swollen, the temperature was raised to 60° C. while stirring at a rotation speed of 20 rpm, and then 5 parts of diketene was added dropwise over 5 hours to further react the mixture for 1 hour.

After the completion of the reaction, the resultant was washed with methanol and dried at 70° C. for 12 hours to obtain a modified PVA-based resin (PVA-2).

<Evaluation of PVA-2>

Evaluation of PVA-2 was performed in the same manner as PVA-1. The results are shown in Table 1.

Example 3

<Preparation of Modified PVA-Based Resin (PVA-3)>

Into a 2 L flask, 640 g of distilled VOAc (vinyl acetate), a predetermined amount of DAMP (2-methylene-1,3-propanediol diacetate), and 210 g of methanol (excluding the amount necessary for dissolving AIBN (2,2-azobisisobutyronitrile)) were charged, and the water bath was heated. After the reflux started, 150 mg of a methanol solution of AIBN was added, and that time was set as the polymerization start time.

The polymerization was completed when the solid content concentration was more than 10%. To complete the polymerization, a solution of m-dinitrobenzene in 300 mL of methanol in an amount sufficient to be 30 ppm with respect to the initial VOAc was prepared in advance, the substances were charged all at once into a reaction kettle and the reaction kettle was cooled to 20° C. or lower. Subsequently, the unreacted VOAc was removed to obtain a methanol solution of a copolymer.

Then, the solution was diluted with methanol to adjust the solid content concentration to 10%. A 2% sodium/methanol solution was added such that the amount of sodium hydroxide was about 40 mmol (with respect to PVOAc (polyvinyl acetate)) and the mixture was stirred, to obtain a suspension in which powder and granules flew. The suspension was filtered and washed to obtain a wet cake. Further, a 2% sodium/methanol solution was added such that the amount of sodium hydroxide was about 200 mmol, the mixture was reacted at 60° C. for 2 hours, and the product was washed to obtain a modified PVA-based resin (PVA-3).

<Evaluation of PVA-3>

Evaluation of PVA-3 was performed in the same manner as PVA-1. The results are shown in Table 1.

Example 4

<Preparation of Modified PVA-Based Resin (PVA-4)>

A modified PVA-based resin (PVA-4) was obtained in the same manner as in Example 3 except that DAAM (diacetone acrylamide) was used instead of DAMP.

<Evaluation of PVA-4>

Evaluation of PVA-4 was performed in the same manner as PVA-1. The results are shown in Table 1.

Comparative Example 1

<Preparation of Unmodified PVA (PVA-5)>

Into a reaction can equipped with a reflux condenser, a dropping device, and a stirrer, 100 parts of vinyl acetate and 33 parts of methanol were charged, the temperature was raised under a nitrogen stream while stirring to reach the boiling point, and then 1.3 parts of acetyl peroxide was charged to start polymerization. When the polymerization rate of vinyl acetate was 81%, a predetermined amount of hydroquinone monomethyl ether was added to complete the polymerization, and then distillation was performed while blowing methanol vapor to remove unreacted vinyl acetate monomer out of the system to obtain a methanol solution of a vinyl acetate polymer.

Then, the above solution was diluted with methanol and adjusted to have a solid content concentration of 47%. The solution temperature was maintained at 45° C., and a methanol solution of 2% sodium hydroxide (in terms of sodium) was added in an amount of 10 mmol with respect to 1 mol of vinyl acetate structural units, thereby performing saponification. As the saponification proceeded, a saponified product was precipitated, and when the form of the precipitated saponified product was turned into a cake shape, the cake was crushed. Thereafter, acetic acid for neutralization was added, and the saponified product was filtered, well washed with methanol and dried in a hot air dryer to obtain an unmodified PVA (PVA-5).

<Evaluation of PVA-5>

Evaluation of PVA-5 was performed in the same manner as PVA-1. The results are shown in Table 1.

Comparative Example 2

<Preparation of Unmodified PVA (PVA-6)>

Into a reaction can equipped with a reflux condenser, a dropping device, and a stirrer, 20 parts of vinyl acetate (total 20% for initial charge) and 34.5 parts of methanol were charged, the temperature was raised under a nitrogen stream while stirring to reach the boiling point, and then 0.068 part of acetyl peroxide was charged to start polymerization. After 0.4 hour from the start of polymerization, 80 parts of vinyl acetate was dropped at a constant speed over 9.5 hours. When the polymerization rate of vinyl acetate was 89%, a predetermined amount of hydroquinone monomethyl ether was added to complete the polymerization, and then distillation was performed while blowing methanol vapor to remove unreacted vinyl acetate monomer out of the system to obtain a methanol solution of a vinyl acetate polymer.

Then, the above solution was diluted with methanol and adjusted to have a solid content concentration of 54%. The solution temperature was maintained at 45° C., and a methanol solution of 2% sodium hydroxide (in terms of sodium) was added in an amount of 10 mmol with respect to 1 mol of vinyl acetate structural units, thereby performing saponification. As the saponification proceeded, a saponified product was precipitated, and when the form of the precipitated saponified product was turned into a cake shape, the cake was crushed. Thereafter, acetic acid for neutralization was added, and the saponified product was filtered, well washed with methanol and dried in a hot air dryer to obtain an unmodified PVA (PVA-6).

<Evaluation of PVA-6>

Evaluation of PVA-6 was performed in the same manner as PVA-1. The results are shown in Table 1.

Reference Example 1

The height swelling rate and the residual rate of polylactic acid were determined in the same manner as in PVA-1. The results are shown in Table 1.

In Table 1, "AA" means acetoacetyl, "DAMP" means 2-methylene-1,3-propanediol diacetate, and "DAAM" means diacetone acrylamide.

From the results in Table 1, it was found that the diverting agents of the present invention of Examples 1 to 4 had a high height swelling rate after 30 minutes and a low residual rate after 7 days.

Examples 5 to 7

Modified PVA-based resins (PVA-7 to PVA-9) having the degree of saponification and the average polymerization degree shown in Table 2 were prepared.

Evaluation of PVA-7 to PVA-9 was performed in the same manner as PVA-1. The results are shown in Table 2.

Comparative Example 3

An unmodified PVA (PVA-10) was obtained in the same manner as in Comparative Example 2, except that saponification was performed by adding a methanol solution of 2% sodium hydroxide (in terms of sodium) in an amount of 6.0 mmol with respect to 1 mol of the vinyl acetate structural unit.

Evaluation of PVA-10 was performed in the same manner as PVA-1. The results are shown in Table 2.

|  | Type of PVA | Degree of saponification (mol %) | Average polymerization degree | Modification type | Modification rate (mol %) | Height swelling rate (%) | Residual rate (mass %) | Average particle diameter (μm) |
|---|---|---|---|---|---|---|---|---|
| Example 5 | PVA-7 | 88.0 | 1600 | DADMAC | 1.0 | 140 | 0.6 | 700 |
| Example 6 | PVA-8 | 88.0 | 1800 | Itaconic acid | 1.0 | 167 | 0.6 | 750 |
| Example 7 | PVA-9 | 88.0 | 1800 | QAPM | 2.0 | 133 | 0.1 | 680 |
| Comparative Example 3 | PVA-10 | 88.0 | 1700 | Unmodified | — | 120 | 0.5 | 500 |

In Table 2, "DADMAC" means diallyldimethylammonium chloride, and "QAPM" means trimethyl-(3-methacrylamidepropyl)-ammonium chloride.

From the results in Table 2, it was found that the diverting agents of the present invention of Examples 5 to 7 had a high height swelling rate after 30 minutes and a low residual rate after 7 days.

Therefore, the diverting agent of the present invention can exhibit sufficient filling properties against a fracture in a well and can exhibit excellent dissolution performance during subsequent removal.

Although the present invention has been described in detail with reference to specific embodiments, it will be apparent to those skilled in the art that various changes and modifications can be made without departing from the spirit

|  | Type of PVA | Degree of saponification (mol %) | Average polymerization degree | Modification type | Modification rate (mol %) | Height swelling rate (%) | Residual rate (mass %) | Average particle diameter (μm) |
|---|---|---|---|---|---|---|---|---|
| Example 1 | PVA-1 | 96.5 | 1800 | Maleic acid | 2.1 | 218 | 0.4 | 1100 |
| Example 2 | PVA-2 | 98.0 | 2400 | AA | 4.0 | 218 | 2.8 | 377 |
| Example 3 | PVA-3 | 99.9 | 1600 | DAMP | 2.5 | 140 | 9.0 | 1000 |
| Example 4 | PVA-4 | 98.5 | 1800 | DAAM | 4.5 | 133 | 0.3 | 1000 |
| Comparative Example 1 | PVA-5 | 99.0 | 1800 | Unmodified | — | 180 | 87.0 | 650 |
| Comparative Example 2 | PVA-6 | 99.0 | 500 | Unmodified | — | 150 | 84.0 | 600 |
| Reference Example 1 | — | — | — | — | — | 100 | 100 | — | and scope of the present invention. The present application is based on a Japanese Patent Application (Japanese Patent Application No. 2018-245097) filed on Dec. 27, 2018, contents of which are incorporated herein by reference,

The invention claimed is:

1. A diverting agent, comprising: a modified polyvinyl alcohol-based resin, wherein:
   the modified polyvinyl alcohol-based resin comprises a modifying group comprising a carboxyl group, a cationic group, or an active methylene-containing group;
   the modified polyvinyl alcohol-based resin has a form that is columnar or powdery; and
   a 4 mass % aqueous solution of the modified polyvinyl alcohol-based resin has a viscosity of 2 mPa·sec to 80 mPa·sec when measured at 20° in accordance with JIS K 6726:1994.

2. The diverting agent according to claim 1, wherein the modified polyvinyl alcohol-based resin is a polyvinyl alcohol-based resin having a hydrophilic group.

3. The diverting agent according to claim 1, wherein the modified polyvinyl alcohol-based resin has a modification rate of 10.0 mol % or less.

4. A method of temporarily filling a fracture generated in a well, the method comprising:
   allowing the diverting agent according to claim 1 to flow into a fracture to be filled with a flow of a fluid in the well.

* * * * *